US011170591B2

(12) United States Patent
Bates et al.

(10) Patent No.: US 11,170,591 B2
(45) Date of Patent: Nov. 9, 2021

(54) SYSTEMS AND METHODS FOR WIRELESS UNLOCKING A LOCK ASSOCIATED WITH AN ENCLOSED SPACE WITHIN A VEHICLE

(71) Applicant: Panasonic Avionics Corporation, Lake Forest, CA (US)

(72) Inventors: Steven Bates, Mission Viejo, CA (US); Philip Watson, Lake Forest, CA (US)

(73) Assignee: PANASONIC AVIONICS CORPORATION, Lake Forest, CA (US)

(*) Notice: Subject to any disclaimer, the term of this patent is extended or adjusted under 35 U.S.C. 154(b) by 77 days.

(21) Appl. No.: 16/689,029

(22) Filed: Nov. 19, 2019

(65) Prior Publication Data

US 2021/0150834 A1 May 20, 2021

(51) Int. Cl.
| | |
|---|---|
| *G07C 9/00* | (2020.01) |
| *G07F 17/00* | (2006.01) |
| *G07C 5/00* | (2006.01) |
| *E05B 47/06* | (2006.01) |
| *E05C 3/12* | (2006.01) |
| *E05C 3/24* | (2006.01) |
| *B64D 11/00* | (2006.01) |

(52) U.S. Cl.
CPC ...... *G07C 9/00182* (2013.01); *E05B 47/0607* (2013.01); *E05C 3/12* (2013.01); *G07C 5/008* (2013.01); *G07F 17/0014* (2013.01); *B64D 11/003* (2013.01); *E05C 3/24* (2013.01)

(58) Field of Classification Search
CPC . G07C 9/00182; G07C 5/008; G07F 17/0014; E05B 47/0607; E05C 3/12; E05C 3/24; B64D 11/003; Y10T 292/08
See application file for complete search history.

(56) References Cited

U.S. PATENT DOCUMENTS

| | | | |
|---|---|---|---|
| 7,028,304 B1 * | 4/2006 | Weinberger | G06Q 10/10 |
| | | | 709/227 |
| 8,108,068 B1 * | 1/2012 | Boucher | G01G 17/00 |
| | | | 700/236 |
| 9,013,328 B2 * | 4/2015 | Hashberger | E05C 3/12 |
| | | | 340/945 |
| 9,124,580 B1 * | 9/2015 | Sampigethaya | H04B 3/54 |
| 9,162,648 B1 * | 10/2015 | Weng | G07C 9/00309 |
| 9,162,776 B2 * | 10/2015 | Shore | B64F 5/00 |
| 9,530,262 B2 * | 12/2016 | Johnson | H04W 4/80 |
| 9,863,171 B1 * | 1/2018 | Salter | E05B 81/64 |
| 10,229,550 B1 * | 3/2019 | Tudi | G07C 9/00309 |
| 10,370,105 B1 | 8/2019 | Godecker et al. | |
| 10,780,980 B2 * | 9/2020 | Riedel | B64F 1/368 |

(Continued)

FOREIGN PATENT DOCUMENTS

| | | |
|---|---|---|
| CN | 109240306 A | 1/2019 |
| CN | 109544816 A | 3/2019 |

(Continued)

*Primary Examiner* — Brian E Miller
(74) *Attorney, Agent, or Firm* — Perkins Coie LLP

(57) ABSTRACT

Systems and methods for wireless unlocking of lock systems on enclosures within a vehicle are provided. A lock system may be unlocked via a digital key communicated to the lock system via any suitable communication protocol, for example, a short range communication protocol. The digital key can be embedded or otherwise stored and accessed in an application accessible via a user interface device.

20 Claims, 7 Drawing Sheets

(56) References Cited

U.S. PATENT DOCUMENTS

| | | | |
|---|---|---|---|
| 10,793,277 B2* | 10/2020 | Simms | A47F 5/08 |
| 10,798,549 B1* | 10/2020 | Reed | B64D 11/04 |
| 10,885,492 B2* | 1/2021 | Goldberg | G07F 17/0071 |
| 2005/0197844 A1* | 9/2005 | Ng | G06Q 10/08 |
| | | | 705/333 |
| 2005/0212656 A1* | 9/2005 | Denison | B60R 25/102 |
| | | | 340/5.73 |
| 2008/0071398 A1* | 3/2008 | Kneller | B64D 11/003 |
| | | | 700/83 |
| 2010/0050709 A1* | 3/2010 | Neville | G07C 9/00912 |
| | | | 70/158 |
| 2010/0078475 A1* | 4/2010 | Lin | G06Q 50/14 |
| | | | 235/380 |
| 2012/0203376 A1* | 8/2012 | Savage | B25H 3/06 |
| | | | 700/214 |
| 2012/0278228 A1* | 11/2012 | Rubinstein | G07F 9/026 |
| | | | 705/39 |
| 2013/0027183 A1* | 1/2013 | Wu | G01C 21/3682 |
| | | | 340/5.64 |
| 2014/0049099 A1* | 2/2014 | Sampigethaya | H04B 3/548 |
| | | | 307/1 |
| 2014/0280740 A1* | 9/2014 | Alley | H04L 69/329 |
| | | | 709/219 |
| 2016/0027261 A1* | 1/2016 | Motoyama | G08B 5/36 |
| | | | 340/313 |
| 2016/0055695 A1* | 2/2016 | Saeedi | G07C 9/257 |
| | | | 340/5.52 |
| 2016/0180618 A1* | 6/2016 | Ho | G07C 9/00563 |
| | | | 340/5.52 |
| 2016/0189498 A1* | 6/2016 | Sharma | G08B 25/08 |
| | | | 340/542 |
| 2016/0251101 A1* | 9/2016 | Kong | B65B 35/30 |
| | | | 53/445 |
| 2016/0275450 A1* | 9/2016 | Chang | A47G 29/141 |
| 2016/0300187 A1* | 10/2016 | Kashi | G06Q 10/0836 |
| 2016/0371907 A1* | 12/2016 | Ma | E05B 17/10 |
| 2017/0152044 A1 | 6/2017 | Balasubramanian | |
| 2017/0233098 A1 | 8/2017 | Gerard | |
| 2017/0236195 A1 | 8/2017 | Verweij | |
| 2017/0286905 A1* | 10/2017 | Richardson | G06Q 10/0836 |
| 2018/0070753 A1* | 3/2018 | Eveloff | H04W 4/025 |
| 2018/0121873 A1* | 5/2018 | Walsh | G06Q 10/0836 |
| 2018/0257554 A1 | 9/2018 | Simms et al. | |
| 2018/0261026 A1* | 9/2018 | Simms | B64D 11/003 |
| 2019/0042175 A1 | 2/2019 | Shah et al. | |
| 2019/0088048 A1* | 3/2019 | Minsley | G07C 9/21 |
| 2019/0259233 A1* | 8/2019 | Lee | G07C 9/00817 |
| 2020/0104891 A1* | 4/2020 | Rule | H04L 63/0807 |
| 2020/0115924 A1* | 4/2020 | Bambeck | E05F 15/614 |
| 2020/0128992 A1* | 4/2020 | Mountford | A47B 57/585 |
| 2020/0285726 A1* | 9/2020 | Kalous | G07C 9/00182 |
| 2020/0339064 A1* | 10/2020 | Gengler | G07C 9/00571 |
| 2021/0035063 A1* | 2/2021 | Cartwright | G07F 9/026 |
| 2021/0073716 A1* | 3/2021 | Dearing | G06Q 10/083 |

FOREIGN PATENT DOCUMENTS

| | | |
|---|---|---|
| WO | 2015079190 A1 | 6/2015 |
| WO | 2017176116 A1 | 10/2017 |

* cited by examiner

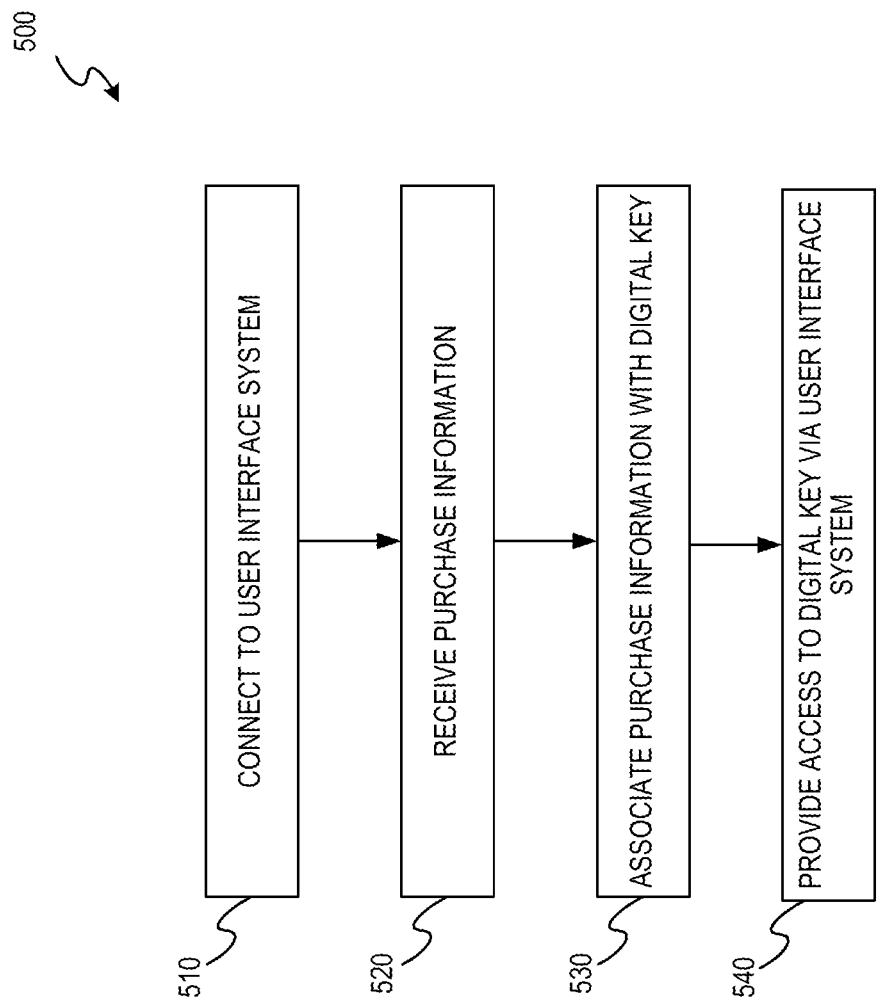

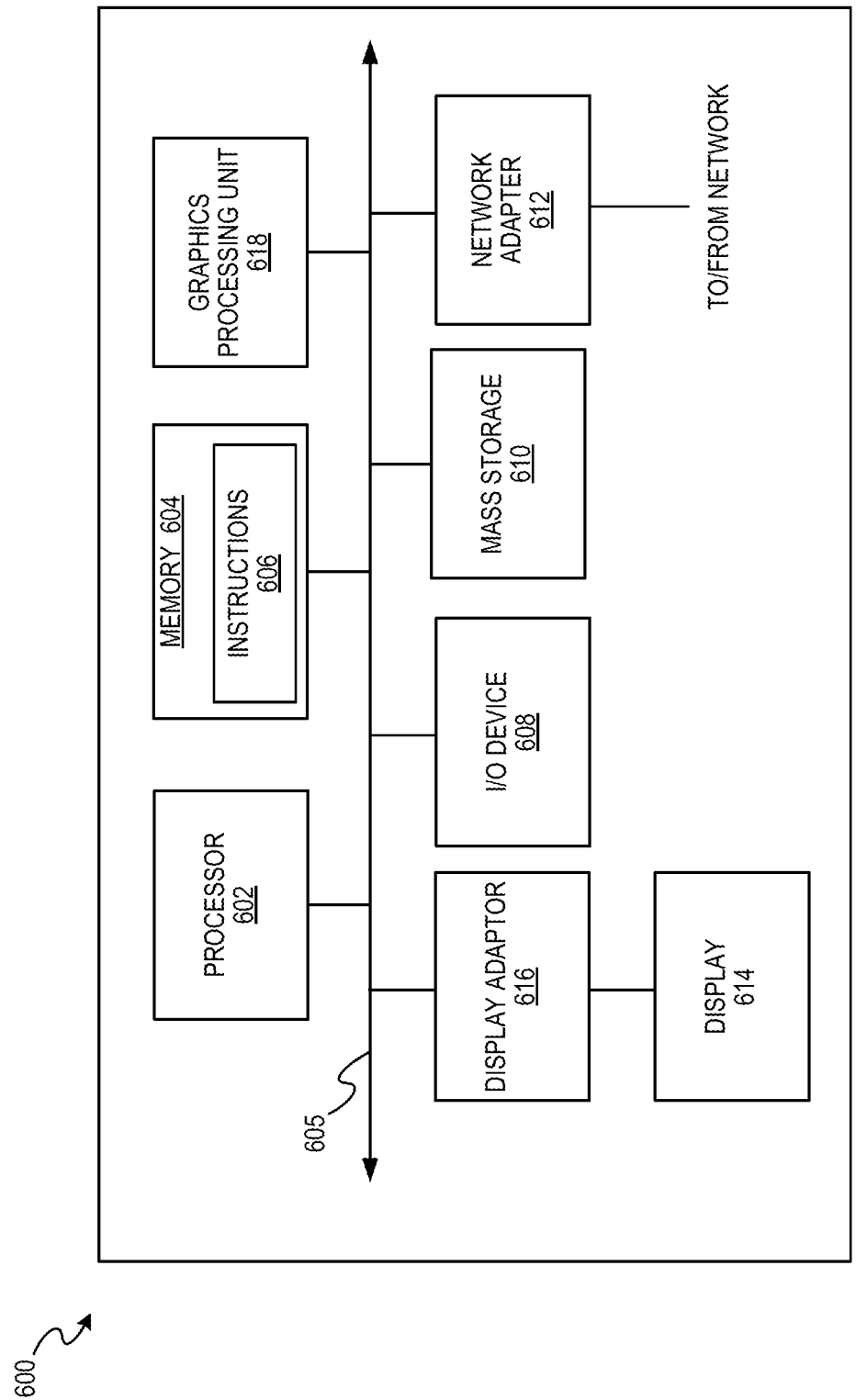

SYSTEMS AND METHODS FOR WIRELESS UNLOCKING A LOCK ASSOCIATED WITH AN ENCLOSED SPACE WITHIN A VEHICLE

BACKGROUND

Technical Field

The present disclosure relates generally to securely and wirelessly unlocking locks associated with enclosed spaces within vehicles.

Related Art

Transportation service providers such as airlines sell various products and services available for in-flight enjoyment. Expenses associated with fuel, maintenance, and labor (e.g., pilot, flight attendants) are difficult to reduce. However, airlines are able to increase profits per passenger by selling products (e.g., food, beverages, electronics, duty-free items), storage space, content, internet, and other services available in-flight. The availability of such products and services also has the benefit of improving passenger satisfaction.

Where such products and services are available, passengers may decline to make a desired purchase if the inconvenience associated with purchasing the product or service outweighs the perceived benefit. For example, many passengers tend to avoid interactions with others in-flight, sometimes opting to wear headphones and/or avoid getting out of their seats. For such passengers, making a purchase may not be worth it if they believe it will be a bother to the attendant or other passengers nearby.

From the airlines' perspective, there are generally a fixed number of employees on a flight, and it can be difficult to provide add-on products and services to passengers in a convenient and efficient manner. Accurately predicting what the demand on a given flight will be is not feasible without requiring that passengers pre-purchase items and/or relying on historical selection information. Thus the flight may be overstaffed, increasing the airlines' overhead, or may be understaffed, making it inconvenient for passengers to make purchases.

Some attempts have been made to improve passenger ability to make purchases in-flight. Passengers are now able to order food, beverages, internet access, and multimedia content via in-flight entertainment systems (IFE systems) without ever leaving their seats. However, in order to retrieve certain products ordered via the IFE systems, there are often delays, and an attendant will typically need to prepare the order and deliver it to the passenger.

The present disclosure is directed toward overcoming one or more of the problems identified above and/or providing advantages over prior systems and methods of providing products and services to passengers in transit.

SUMMARY

A system for providing access to an enclosed space or enclosure within a vehicle associated with a user selection and/or a purchase is disclosed herein. The system comprises a content distribution system configured to provide a vehicle communication network for the vehicle, one or more data stores coupled to the vehicle communication network, the at least one data store configured to store a set of digital keys associated with a set of lock systems within the vehicle, and at least one processor coupled to the vehicle communication network and to at least one memory programmed with executable instructions. The at least one processor may be configured to execute the executable instructions to (a) receive, from a user interface system carried by the vehicle and coupled to the vehicle communication network, selection information associated with a first lock system of the set of lock systems, (b) associate a first digital key with the received selection information, and (c) transmit or otherwise allow access to the first digital key to the user interface system, wherein the digital key allows the user to wirelessly unlock a first door on which the first lock system is located by sending the digital key to the first lock system via short range wireless communication.

In some embodiments, digitals keys may be embedded in a software application of the user interface system (e.g., a crew-member PED (personnel electronic device)). Authentication of the user (e.g., password, fingerprint, facial recognition) may be required before the user may access one or more of the digital keys. This step can be in place of transmitting the first digital key to the user interface system.

The at least one processor may further be configured to execute the executable instructions to present a user with information associated with enclosures (e.g., availability, price, services available) from which the user may make one or more selections.

In another aspect, a method for wirelessly unlocking a lock to an enclosure within a vehicle is disclosed herein. The method comprises the step of inputting, via a user interface system carried by the vehicle and coupled to a vehicle communication network, selection information associated with a first enclosure having a first lock system including the lock. In another step, the method comprises accessing (e.g., receiving), via a platform system carried by the vehicle and coupled to the vehicle communication network, a digital key associated with the selection information and the first lock system. In yet another step, the method comprises sending/communicating the digital key to the first lock system to wirelessly unlock the lock based on a position of the user interface system relative to the first lock system or based on a user input into the user interface system.

Existing intelligent door lock systems may be utilized in systems and methods of the inventive subject matter. Exemplary door lock systems include those described in U.S. Pat. No. 9,530,262 to August Home Inc. These and all other publications are incorporated herein in their entirety.

Other advantages and benefits of the disclosed system and methods will be apparent to one of ordinary skill with a review of the following description.

BRIEF DESCRIPTION OF THE DRAWINGS

The details of embodiments of the present disclosure, both as to their structure and operation, can be gleaned in part by study of the accompanying drawings, in which like reference numerals refer to like parts, and in which:

FIG. 5 is an example method flow for transmitting and/or unlocking a digital key associated with a lock system of an enclosure in accordance with the present disclosure;

FIG. 6 illustrates a block diagram of a computing system, in accordance with various aspects of the present disclosure.

DETAILED DESCRIPTION

Figure 1:
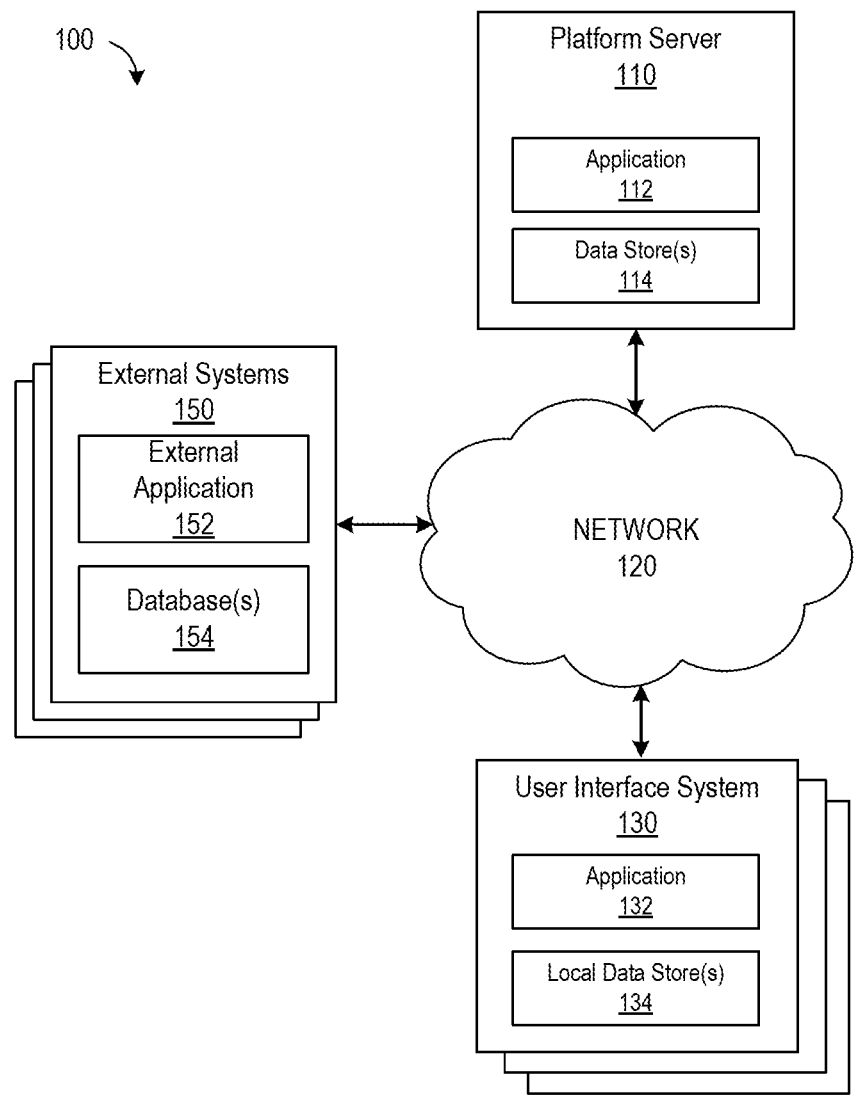
FIG. 1 schematically illustrates an example wireless unlocking system in accordance with the present disclosure.

The detailed description set forth below, in connection with the accompanying drawings, is intended as a description of various embodiments and is not intended to represent the only embodiments in which the disclosure may be practiced. The detailed description includes specific details for the purpose of providing a thorough understanding of the embodiments. However, it will be apparent that those skilled in the art will be able to understand the disclosure without these specific details. In some instances, well-known structures and components are shown in simplified form for brevity of description. Some of the surfaces have been left out or exaggerated for clarity and ease of explanation.

As used herein, the terms "environment," "platform," "component," "module," "system," and the like as used herein are intended to refer to a computer-related entity, either software-executing general purpose processor, hardware, firmware or a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a key having one or more data packets (e.g., data from one component interacting with another component in a local system, distributed system, and/or across a network such as the Internet with other systems via the key).

Computer executable components can be stored, for example, at non-transitory, computer/machine readable media including, but not limited to, an ASIC (application specific integrated circuit), CD (compact disc), DVD (digital video disk), ROM (read only memory), hard disk, EEPROM (electrically erasable programmable read only memory), solid state memory device or any other storage device, in accordance with the claimed subject matter.

The term "user" is used herein to refer to any person or entity that uses or otherwise interacts with the systems described here. User may refer to an operator, passenger, occupants, travelers, crew members, or any person or entity who interacts with any part of the systems described herein. The term "passengers" and/or "travelers" may refer to any persons who are customers or otherwise being transported by the vehicle who may use or otherwise interact with the systems described here.

References throughout this specification to "an embodiment" or "an implementation" mean that a particular feature, structure, or characteristic described in connection with the embodiment is included in at least one embodiment or implementation. Thus, appearances of the phrase "in an embodiment" in various places throughout this specification are not necessarily all referring to the same embodiment or a single exclusive embodiment. Furthermore, the particular features, structures, or characteristics described herein may be combined in any suitable manner in one or more embodiments or one or more implementations.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or passenger control over certain aspects of the implementation, depending on the desired implementation of one of ordinary skill in the art practicing implementations of the present application. Further, sequential terminology, such as "first", "second", "third", etc., may be used in the description and claims simply for labeling purposes and should not be limited to referring to described actions or items occurring in the described sequence. Actions or items may be ordered into a different sequence or may be performed in parallel or dynamically, without departing from the scope of the present application. Similarly, the various processes and methods described herein may be described with reference to flow charts having process blocks illustrated in a particular sequence. However, the example implementations are not limited to the particular sequence illustrated. Example implementations may include actions being ordered into a different sequence as may be apparent to a person of ordinary skill in the art or actions may be performed in parallel or dynamically, without departing from the scope of the present application.

The present disclosure is directed to innovative systems and methods that allow users to obtain access to digital keys that can be used to send signals via a wireless communication protocol (e.g., a short range wireless communication protocol) to wirelessly lock and/or unlock lock systems associated with enclosures within a vehicle. Each digital key may be associated with an enclosure and/or a lock system of the enclosure, and be identifiable based on selection information obtained from a user interface system and/or one or more data stores.

Contemplated systems may include a platform including a backend server hosting an application communicatively coupled to an application executed on user interface systems operated by a passenger carried by the vehicle. Embodiments provided herein advantageously allow passengers to purchase items and access certain enclosures without a need to interact with persons in the vehicle. Further, unlike conventional methods of unlocking high-value carts, which involve traditional keyed locks, or combination padlocks that require that crew members carry a key onboard, and/or remember a combination, there is little or no risk of the digital keys becoming well-known over time, or forgotten/lost.

As used herein, the term "short range wireless communication" includes Bluetooth, near field communication (NFC), and similar technologies providing for short range communications between devices.

As used herein, the term "selection information" should be interpreted broadly to include any information that identifies an enclosure and/or a lock system associated with an enclosure, and/or identifies a product or service being selected by a user. For example, selection information can comprise any information that is useful in identifying the user to be given access to an enclosure having a lock system, a purchase associated with access to an enclosure having a lock system, an enclosure having a locking system to be unlocked by a digital key, and/or the associated digital key. Such information can include user identification information (e.g., user account information, biometric information, password, user interface device associated with a user), payment account information (e.g., bank account number, credit card number), itinerary information (e.g., seat number, flight number, departure time, landing time), enclosure identification information (e.g., enclosure location, products in an enclosure, services available in an enclosure), restrictions information (e.g., time period associated with a purchase, age limitation), purchase identifying information (e.g., lock system identification information, key identification information, purchased product or service information, and/or rewards program information (e.g., loyalty card number).

A digital key could be a symmetric key (a shared secret), or a digital certificate that uniquely identifies a user, the certificate being signed by a trusted issuer (e.g., the airline or transportation company). The latter affords more discrete auditing records and allows the operator to revoke a user's keys, for example, as a crew member departs the company, or as a passenger leaves the vehicle. A certificate revocation list ("CRL"), which is a list of digital certificates that have been revoked by the issuing certificate authority, could be uploaded to all the relevant wireless locks during maintenance when the vehicle is on the ground, or via wireless communication (e.g., Bluetooth) during an on-vehicle visit by a trusted maintenance device.

It should be appreciated that the digital keys described herein can allow a user to unlock a lock system on or coupled with an enclosed space via any suitable wireless communication protocol (e.g., short range wireless communication protocols). A digital key can be associated with, for example, a restriction, a user, a lock system, and/or an enclosure that is identifiable based on selection information. In some contemplated embodiments, a user interface system sends a digital key to a lock system, which enables the lock to be locked or unlocked in response to the key. An operator of the locking system can configure or cause the lock to be locked or unlocked via wireless communication at a predetermined time or in real time, which can provide the operator control over the locking system and enclosure when a user breaks a rule or remains in the enclosure past the purchased time. The operator of the locking system can also cause a lock to remain locked even where a key for unlocking the lock is communicated by a user interface system. This allows the operator to keep an enclosure locked, for example, for safety reasons. It is also contemplated that the operator will be able to track access information (e.g., what device was used to unlock a locking system, time spent in an enclosure), and/or grant and revoke permissions by controlling the locking systems and/or digital key access.

It is contemplated that a digital key may wirelessly unlock a lock system automatically when the user interface system is within a predetermined distance of the first lock system. Additionally or alternatively, the digital key may wirelessly unlock the first door based on a user input, for example, via the user interface system.

An exemplary use of systems and methods of the inventive subject matter is purchases by passengers in-flight. A passenger could order an item via their mobile device or an in-seat device, which can cause an autonomous cart having wireless communication capabilities and a sensor to receive signals from user interface systems to arrive at or near the passenger's seat or other selected location. When the autonomous cart arrives at the seat or selected location, the passenger may present its device, which has been loaded as part of the purchasing process, with a temporary digital key that unlocks a compartment (e.g., drawer) of the cart from which the purchased item can be removed. The passenger device may be short range wireless communication enabled and be applied to a short range wireless communication enabled lock system in order to read its memory. For example, the passenger device may have a software application loaded onto it that permits it to use short range wireless communication protocols to transmit the digital key to a lock system of the cart. Thus maintenance issues based on having a surface (e.g., for a PIN) or lens (e.g., for a barcode reader) touched by passengers can be avoided.

Lock systems of the inventive subject matter may be battery operated wireless systems that can be locked and/or unlocked via any wireless means, including short range wireless communication. In some aspects of the inventive subject matter, a digital key corresponding to a lock system can be accessed via a crew-issued PED with an application loaded onto it, which embeds the trusted key. When an unlock operation is desired, the crew member or other user can unlock the PED (e.g., via fingerprint ID, a PIN, a gesture, facial recognition, biometrics), and activate the application. Upon activation, being positioned within a predetermined distance of the lock system, and/or based on a user input, the key can be sent to the lock via short range wireless communication, and the lock of the lock system can be unlocked. The lock system electronics could log the digital key in its local memory in order to afford auditing records.

In another exemplary use of systems and methods of the inventive subject matter, a user may wirelessly unlock a lock system of enclosures protected by secure doors within the vehicle. The lock systems are associated with digital keys that control access to the various enclosures within a vehicle. Such enclosures include, for example, crew rest areas, duty free product carts or enclosures, galley carts, lounges, storage areas (e.g., for secure storage of valuable personal items such as instruments, jewelry, documents), lavatories, workout areas, sleeping rooms, massage table enclosures, salon enclosures, nursing lounges, or even flight deck doors. The power for the wireless lock/lock systems could be provided by the vehicle and/or a battery for such fixed installed locations. For these fixed installed locks and lock systems, a wired maintenance bus could be permanently connected through which access logs could be automatically offloaded, and CRLs remotely loaded.

Various embodiments described herein provide for a software application stored as instructions in a memory of a PED (sometimes referred to herein as a device memory) that are executable by a processor of the PED (sometimes referred to herein as a device processor). By executing the software application, a graphical user interface ("GUI") may be generated through which the passenger may make a purchase and/or input selection information as further described herein. The passenger may input the selection information into screens generated by the GUI and/or scan selection identifying information (e.g., using a camera or other imaging device coupled to the PED, radio frequency identification reader, or identification readers). Where the passenger and PED are in flight, the PED may communicate with the IFE system on the aircraft, via a communication network supplied by the IFE system. If the passenger is on the ground (e.g., not yet departed the airport on take-off or has landed at an airport), the PED may utilize the software application to make a purchase or communicate data via the user interface system over any available communication network (e.g., wired, Wi-Fi, cellular network, etc.). In some embodiments, the above described software application may be pre-loaded into a device memory integrated with a mode of transportation and connected to an internal network system of the mode of transportation (e.g., interactive screen on the back of the headrest on an airplane), such as in-seat and/or seatback devices including a monitor display (interchangeably referred to herein as in-seat device).

Another embodiment provides for using the IFE system of the aircraft, for example, via a browser-based portal application. The browser-based portal application may be hosted by the IFE system and accessed via a browser application executed at a PED and/or in-seat device.

Various digital keys and/or selection information may include one or more restrictions relating to an enclosure, and a passenger's ability to unlock a lock system using a digital key. These restrictions may be obtained, for example, through selection information stored in the aircraft or airline operator systems, selection information derived from a purchase made via a user interface system, and/or via an input of selection information by a user of the user interface system. Restrictions may include, but are not limited to, a period of time during which the digital key can be used to unlock a wireless lock associated with an enclosure, a period of time during which the digital key can only be used if the user interface system is within the enclosure, the number of times an unlock and/or lock function may be used, and/or an automatic unlock feature associated with a digital key.

As yet another example, embodiments herein may access third party systems via wireless communications to retrieve restrictions or other information that may impact use or accessibility of a digital key. Example third party systems include systems external or otherwise remote of the PED and/or IFE systems described herein, for example but not limited to, payment systems, and third party vendors of products or services within the enclosures.

FIG. 1 schematically illustrates an example wireless unlocking system in accordance with the present disclosure. The infrastructure of the wireless unlocking system 100 shown in FIG. 1 comprises a platform server 110, which hosts and/or executes one or more of the various functions, processes, and/or methods described herein of the wireless unlocking system 100. Platform server 110 may comprise one or more dedicated servers, or may instead comprise cloud instances, which utilize shared resources of one or more servers. These servers or cloud instances may be collocated and/or geographically distributed. Platform server 110 may also comprise or be communicatively connected to platform server application 112 and/or one or more data stores 114. In addition, platform server 110 may be communicatively connected to one or more user interface systems 130 via network 120. Platform server 110 may optionally be communicatively connected to one or more external systems 150 (e.g., websites, apps, other servers, etc.) via network 120. External systems 150 may host third party systems or remote services and/or resources. Platform server 110 may be implemented as one or more computing devices such as, for example, computing device 600 illustrated in FIG. 6 discussed below.

Network 120 may include the Internet and/or an intranet, and platform server 110 may communicate with user interface system(s) 130 through the network 120 using standard transmission protocols, such as HyperText Transfer Protocol (HTTP), Secure HTTP (HTTPS), File Transfer Protocol (FTP), FTP Secure (FTPS), SSH FTP (SFTP), and the like. While platform server 110 is illustrated as connected to various systems through a single set of network(s) 120, it should be understood that platform server 110 may be connected to the various systems via different sets of one or more networks. For example, platform server 110 may be connected to a subset of user interface systems 130 and/or external systems 150 via the Internet, but may be connected to one or more other user interface systems 130 and/or external systems 150 via an intranet. As another example, network 120 may be or otherwise include an internal network system in a mode of transportation (e.g., a vehicle such as an aircraft or transportation vehicle) that connects user interface systems 130 carried by the mode of transportation to the platform server 110. Network 120 may also include any wired or wireless network, for example, a cellular network (e.g., 3G, 4G LTE, 5G, etc.), local area network (LAN), wide area network (WAN), etc. Furthermore, while only one or a few user interface systems 130, external systems 150, application 112, and sets of database(s) 114 are illustrated, it should be understood that the infrastructure may comprise any number of user interface systems, external systems, server applications, and databases.

User interface system(s) 130 may comprise any type of computing devices capable of wired and/or wireless communication. Contemplated user interface systems include personal electronic devices ("PEDs") carried by a passenger, crew-member, or other user, and/or in-seat devices of an inflight entertainment systems or inflight entertainment and communication systems (each of which are referred to herein as "IFE Systems") that facilitate transactions and other communications whilst the passenger is in mid-flight. Example user interface systems 130 may include PEDs through which a user is able to interface with the platform server 110, which may include any PEDs having wireless communication capability, such as cellular phones, smart phones, tablet computers, laptop computers, and other portable electronic devices (PEDs), a digital electronic media device, wearable smart electronic device, smart watch, any mobile electronic device, and the like. FIG. 6 illustrates an example computing device 600 that may be implemented as a user interface system 130. User interface systems 130 may also be a device that is integrated with a mode of transportation and connected to an internal network system of the mode of transportation (e.g., interactive screen on the back of the headrest on an airplane), such as in-seat and/or seatback devices including a monitor display (interchangeably referred to herein as in-seat device). FIG. 2 illustrates an example mode of transportation comprising user interface systems 130.

Platform server 110 may comprise web servers which host one or more websites, web services, and/or Internet-based applications. In embodiments in which a website is provided, the website may comprise a GUI generating one or more user interface screens, including, for example, webpages generated in HyperText Markup Language (HTML) or other language and displayed on the user interface systems 130. Platform server 110 transmits or serves the GUI in response to requests from user interface system(s) 130. In some embodiments, the GUI may be served in the form of a wizard, in which case two or more user interface screens may be served in a sequential manner, and one or more of the sequential user interface screens may depend on an interaction of the user or user interface system 130 with one or more preceding user interfaces. The requests to platform server 110 and the responses from platform server 110, including the screens, may both be communicated through network 120. These user interface screens or web pages may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more data stores (e.g., data stores 114) that are locally and/or remotely accessible to platform server 110. Platform server 110 may also respond to other requests from user interface system(s) 130.

Platform server 110 may further comprise, be communicatively coupled with, or otherwise have access to external systems 150. The external systems 150 may be configured to provide digital keys associated with third party services and/or information based on requests received from the platform server 110. For example, the platform server 110 may communicate with the external systems 150 to request data or request execution of third party services (e.g., access to massage or other services available in one or more enclosures, access to a user's third party account information that allows user's media content (e.g., music playlist) to be played within an enclosure to be used by the user) via network 120 and obtain information from third party systems. The request from platform server 110 may be communicated based on inputs received from user interface systems 130 at the platform server 110 so to facilitate or otherwise complete the request. External systems 150 may include their own dedicated servers 152 executing application and database(s) 1514 for executing functions thereof and storing data for executing those functions. Example third party systems may include, but are not limited to, systems external or otherwise remote of the platform server 110 and/or user interface systems 130 described herein, for example but not limited to, systems associated with third party vendors selling products or services on the vehicle.

Platform server 110 may further comprise, be communicatively coupled with, or otherwise have access to one or more data stores 114. For example, platform server 110 may comprise one or more servers which manage one or more data stores 114. A user interface system 130 or application 112 executing on platform server 110 may submit data (e.g., user data, form data, key exchange data, enclosure data, restrictions data (e.g., time of access), etc.) to be stored in data store 114 and/or request access to data stored in data store 114. Data stores 114 may further be configured to store lock system tracking information, for example, how many times the lock system's lock was locked and/or unlocked, the time and location of the locking and/or unlocking, and/or user information associated with the locking and/or unlocking.

Any suitable database may be utilized, including without limitation MySQL™, Oracle™, IBM™, Microsoft SQL™, Sybase™, Access™, and the like, including cloud-based database instances and proprietary databases. Data may be sent to platform server 110, for instance, using the well-known POST request supported by HTTP, via FTP, etc. This data, as well as other requests, may be handled, for example, by server-side web technology, such as a servlet or other software module (e.g., application 112), executed by platform server 110.

In embodiments in which a web service is provided, platform server 110 may receive requests from user interface systems 130 and/or external system(s) 150, and provide responses in eXtensible Markup Language (XML) and/or any other suitable or desired format. In such embodiments, platform server 110 may provide application programming interfaces (API) software development kits (SDK) which define the manner in which user interface system(s) 130 and/or external system(s) 150 may interact with the web service. Thus, user interface system(s) 130 and/or external system(s) 150 (which may each themselves be servers) can define their own user interfaces and rely on the web service to implement or otherwise provide the backend processes, methods, functionality, storage, etc., described herein.

For example, in such an embodiment, a client application 132 executing on one or more user interface system(s) 130 may interact with an application 112 executing on platform server 110 to execute one or more or a portion of one or more of the various functions, processes, methods, and/or software modules described herein. Client application 132 may be "thin," in which case processing is primarily carried out on the backend by application 112 on platform server 110. An example of a thin client application is a browser-based portal application, which requests, receives, and renders webpages at user interface system(s) 130, while the application 112 on platform server 110 is responsible for generating the webpages and managing database functions. Alternatively, the client application may be "thick," in which case processing is primarily carried out client-side by user interface system(s) 130, for example, as a software application installed on the user interface system 130. It should be understood that client application 132 may perform an amount of processing, relative to application 112 on platform server 110, at any point along this spectrum between "thin" and "thick," depending on the design goals of the particular implementation. In any case, the application described herein, which may wholly reside on either platform server 110 (e.g., in which case application 112 performs all processing) or user interface system(s) 130 (e.g., in which case application 132 performs all processing) or be distributed between platform server 110 and user interface system(s) 130 (e.g., in which case application 112 and client application 132 both perform processing), can comprise one or more executable software modules that implement one or more of the processes, methods, or functions of the application(s) described herein.

Similarly, application 112 may interact with an external or third party application executing on external system 150 to execute one or more or a portion of one or more of the third party functions, processes, methods, and/or software modules and retrieve information based thereon. The external system 150 may provide an API and/or SDK which defines the manner in which platform server 110 may interact with the web services provided by the external system 150. Application 112 may be "thin," in which case processing is primarily carried out by the external system 150. Alternatively, the application 112 may be "thick," in which case processing is primarily carried out by platform server 110. It should be understood that platform server 110 may perform an amount of processing, relative to external system 150, at any point along this spectrum between "thin" and "thick," depending on the design goals of the particular implementation. In any case, the application described herein, which may wholly reside on either platform server 110 or external system 150 or be distributed between platform server 110 and external system 150, can comprise one or more executable software modules that implement one or more of the processes, methods, or functions of the application(s) described herein.

In some embodiments, application 112 may interact with third party applications executing on external system 150 to import data and information from external systems 150. For example, instructions for executing one or more or a portion of one or more of the third party functions, processes, methods, and/or software modules may be stored at the platform server 110. Such interaction may be provided by an importer module included as a plug-in in the application 112 for retrieving data in a first format associated with an external system 150 and converting the data into a second format associated with the platform server 110. An example importer module may be provided as an API and/or SDK as described above. Alternatively, or in combination, the importer module may include data scraping instructions for extracting data from a human-readable output generated by processes executed at the external systems 150. In various embodiments, the data scraping instructions may be web scraping instructions for extracting data from web services provided by the external systems 150.

Figure 2A:
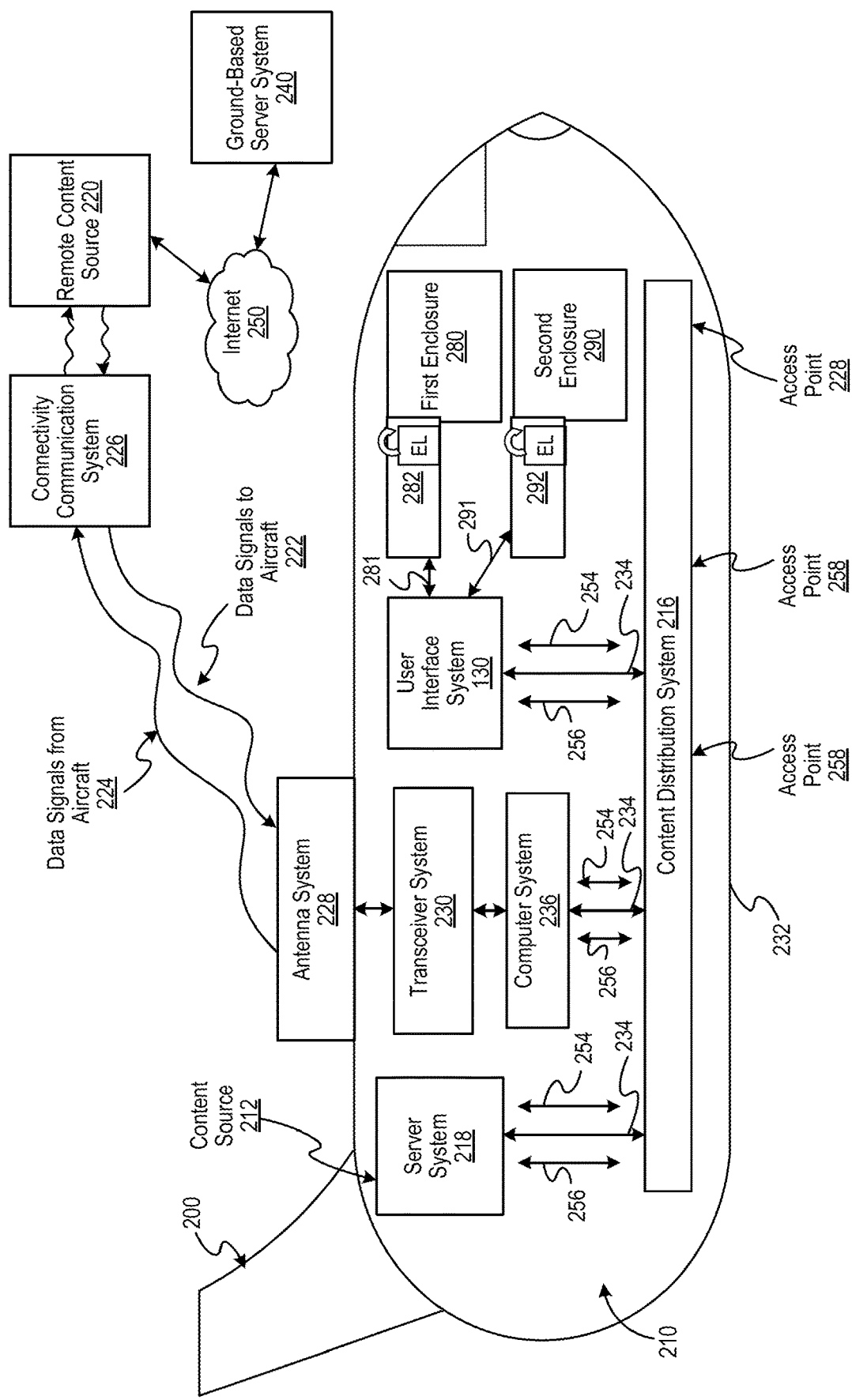
FIG. 2A is a schematic block diagram of an example of a vehicle information system for installation on-board a vehicle that may comprise a portion of or the entirety of the wireless unlocking system of FIG. 1 in accordance with the present disclosure.

FIG. 2A is a schematic block diagram of an example of a vehicle information system for installation on-board a vehicle that may comprise a portion of or the entirety of the wireless unlocking system of FIG. 1 in accordance with the present disclosure.

FIG. 2A shows an example vehicle information system 210 (referred to herein as system 210) that can be configured for installation aboard a vehicle 200. The system 210 may be configured to provide an internal network system within the vehicle 200. When installed on an aircraft, system 210 may comprise an aircraft passenger IFE system. While FIG. 2A illustratively depicts an embodiment where vehicle 200 is implemented as an aircraft, the term "vehicle" is not to be so limited. It will be appreciated that the "vehicle" may refer to any and all types of vehicles providing a mode of transportation including, but not limited to, personal transportation vehicles (e.g., automobiles, boats, motorcycles, etc.) and vehicles of common carriers, such as airplanes, passenger trains, buses, cruise ships, sightseeing vehicles (e.g., ships, boats, buses, cars, etc.), or any other moving vehicle.

Figure 2B:
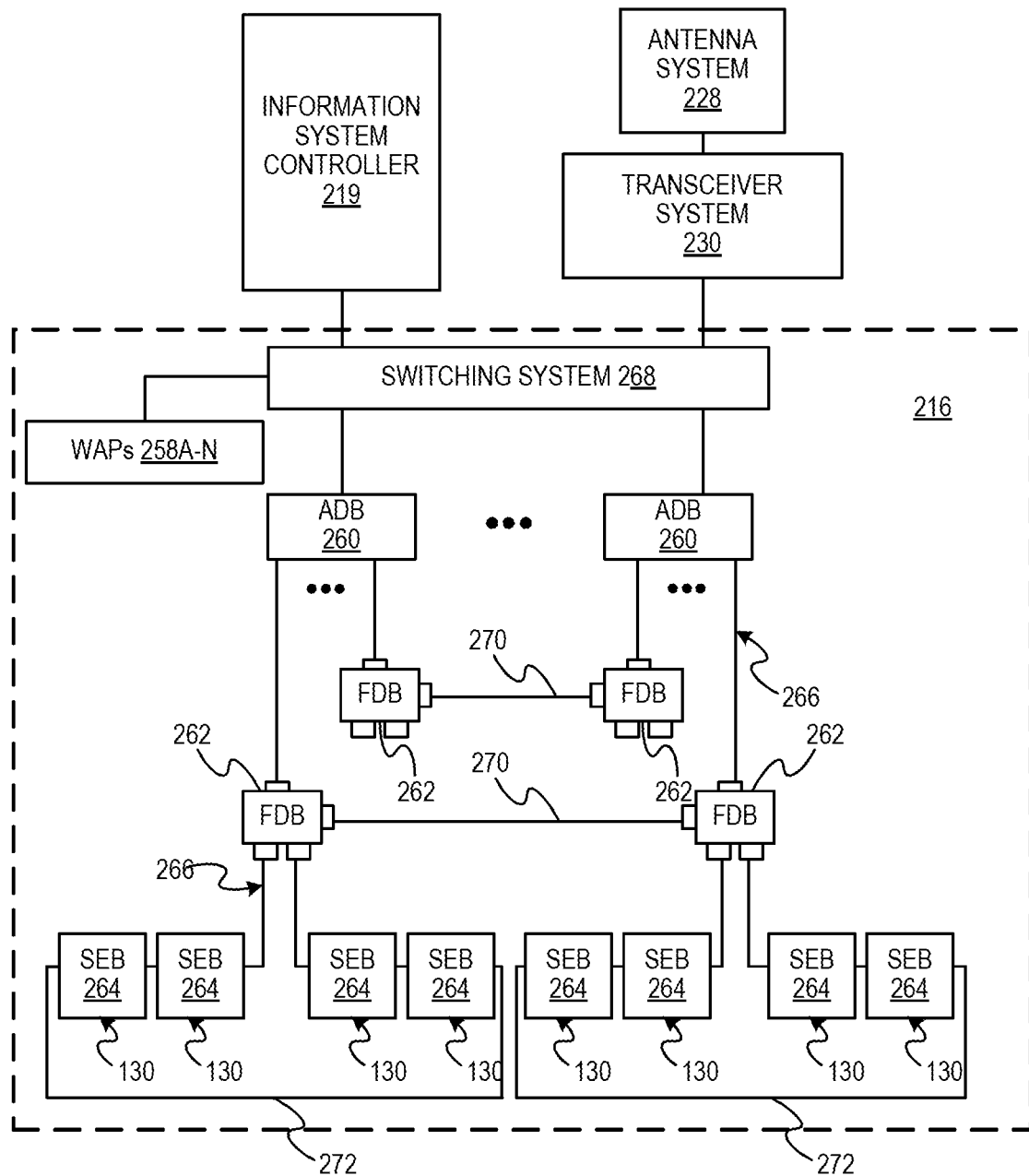
FIG. 2B is a schematic block diagram illustrating an example content distribution system in accordance with the present disclosure.

System 210 comprises a content source 212 and one or more user interface systems 130 (e.g., user interface systems 130 of FIG. 1) communicatively coupled with a real-time content distribution system 216. The content distribution system 216 may provide the internal network system within the vehicle 200 for coupling the user interface systems 130 to content server system 218. User interface systems 130 may comprise one or more of in-seat devices and/or PEDs having wireless communication capability through which passengers of the vehicle (e.g., passengers, crew members, or other persons carried by the vehicle 200) may interact with the system 210. The user interface systems 130 may include NFC and/or Bluetooth enabled devices. The content source 212 may include one or more internal content sources, included in a content server system 218 installed aboard the vehicle 200, one or more remote (or ground-based) content sources 220 external from the vehicle 200, or a distributed content system (e.g., a distributed cloud system). The content server system 218 and computer system 236 can be provided as or as part of an information system controller 219 (as shown in FIG. 2B) for providing overall system control functions for system 210 and/or for providing connectivity functionality, including information transmitted from user interface systems 130 to content server system 218, as desired.

The information system controller 219 may include one or more servers and databases which host and/or execute one or more of the various functions, processes, and/or methods described herein. Example services (sometimes referred to herein as IFE services or functionality or vehicle entertainment services or functionality) offered by system 210 includes, but is not limited to, wired or wireless communication connectivity (such as in-flight Intranet and Internet), information, entertainment (e.g., multimedia entertainment services such as video, movies, television programming, audio, games, etc.), communications (e.g., telephone, VoIP, messaging, etc.), payment services, digital key exchange services, and/or other system services during travel aboard vehicle 200.

In some embodiments, system 210 provides wireless connectivity to a ground-based server system 240. The ground-based server system 240 may be one or more external systems (e.g., external systems 150 of FIG. 1) and may comprise dedicated servers and databases, or may instead be part of a cloud infrastructure, which utilize shared resources of one or more servers for executing and/or supporting the vehicle entertainment and key exchange functionality. For example, the content server system 218 of the information system controller may comprise the platform server 110 for hosting application 112 and data stores 114. In some embodiments, the platform server 110 may be distributed across the content server system 218 and the ground-based server system 240. As such, the content server system 218 may host and/or execute one or more of the various functions, processes, and/or methods described herein locally at the vehicle 200 and store information thereof in local data stores for transmission to a ground-based server system 240. The ground-based server system 240 may host and/or execute the one or more of the various functions, processes, and/or methods described herein.

In some embodiments, the information system controller may also comprise or be communicatively connected to a backend application (e.g., application 112) and/or one or more databases (e.g., data store(s) 114)). For example, content server system 218 may include one or more servers that host one or more backend application platforms for interfacing with user interface systems 130. The content server system 218 transmits or serves these user interface systems 130 in response to requests from user interface systems 130 over the content distribution system 216. In some embodiments, the interfaces may be served in the form of a backend server application, in which case multiple user interfaces systems may be served in a sequential manner. For example, a passenger may access a software application executed on the user interface system 130 to request and respond to content server system 218, which causes backend server application to perform the requested functions (e.g., identifying and provided access to (e.g., transmitting, configuring the application to allow user access to) a digital key associated with a user request or purchase). These executed functions may comprise a combination of content and elements, such as digital keys (digital code based on unique information of the transaction it authenticates and secures), text, images, videos, animations, references (e.g., hyperlinks), frames, inputs (e.g., textboxes, text areas, checkboxes, radio buttons, drop-down menus, buttons, forms, etc.), scripts (e.g., JavaScript), and the like, including elements comprising or derived from data stored in one or more databases that are locally accessible to content server system 218, remotely accessible from remote content source 220, or ground-based server system 240.

Multimedia and other content available from the content sources 212 and/or remote content source 220 provide for two-way communications (e.g., bidirectional communications), such as real-time access to the Internet 250 and/or telecommunications systems (e.g., cellular telecommunication systems). Content available from the content sources 212 may include digital keys for wirelessly unlocking an enclosed space within the vehicle, television programming content, music content, podcast content, photograph album content, audiobook content, and/or movie content without limitation. Content as shown and described herein is not exhaustive and is provided herein for purposes of illustration only and not for purposes of limitation. Multimedia content can comprise any conventional type of audio and/or video content, such as stored (or time-delayed) content and/or live (or real-time) content. The multimedia content can include geographical information, and/or can be associated with digital keys such that the multimedia content is presented to the user within or near an enclosure when a digital key is used.

Being configured to distribute and/or present and/or allow access to the content (including digital keys) provided by content sources 212, system 210 can communicate with the content source 212 and/or remote content source 220 in real time and in any conventional manner, including via wired and/or wireless communications. System 210 and the remote content source 220, for example, can communicate directly and/or indirectly via an intermediate communication system, such as a connectivity communication system 226. Connectivity communication system 226 may provide wireless bidirectional communications, for example, data signals comprising content for system 210. In some embodiments, the bidirectional communication may be a bidirectional communication link over the Internet or other wireless communication protocol. System 210 thereby can receive content from remote content source 220 and/or ground-based server system 240 via data signal 222 and/or transmit (upload) content via data signal 224 (which may be referred to collectively as a bidirectional communication link), including navigation and other control instructions. The remote content source 220 and ground-based server system 240 are shown as having access to the Internet 250 using standard transmission protocols, such as HyperText Transfer Protocol (HTTP), Secure HTTP (HTTPS), File Transfer Protocol (FTP), FTP Secure (FTPS), SSH FTP (SFTP), and the like, as well as proprietary protocols. The connectivity communication system 226 may comprise a satellite communication system or any conventional type of wireless communication system, such as a cellular communication system (not shown) and/or an Aircraft Ground Information System (AGIS) communication system (not shown).

To facilitate communications with the remote content source 220, system 210 may also include an antenna system 228 and a transceiver system 230 for bidirectional communication of data (e.g., content, control, information, etc.) with the remote content source 220. The antenna system 228 may be disposed outside of the aircraft, such as an exterior surface of a fuselage 232 of the vehicle 200. The antenna system 228 can receive content from the remote content source 220 (e.g., digital keys) and provide the data, as processed by the transceiver system 230, to a computer system 236 of the information system controller. For example, the transceiver system 230 may include a transmitter having an encoder, a modulator and an up-converter for encoding, modulating, and up-converting data signals from the content distribution system 216 to antenna system 228 and to the remote content source 220 as signals 224. The transceiver system 230 may also include a receiver having a decoder, a demodulator and a down-converter for decoding, demodulating and down-converting signals received by the antenna system 228 from the connectivity communication system 226 into content 234, such as, data signals including digital keys, video, audio, multimedia, internet, and any content corresponding to functionality of the system 210. While only one transceiver system 230 is shown, a plurality of transceiver systems may be included to enable simultaneous reception of signals from a plurality of transponders. The components of the subsystems included in the transceiver system 230 may be partially or fully integrated and/or separately implemented.

Content in the form of data signals received by the antenna system 228 may be communicated to the computer system 236 and passed to the content server system 218 and/or directly to one or more of the user interface systems 130 as data signals for communicating content 234, instructions 254, and/or control signals 256, as desired. For example, instruction 254 may be data signals communicating instructions, request, and commands from the user interface system 130, while content 234 may be data signals communicating one or more forms of content from the content server system 218 or remote content source 220, for example, digital keys or any content as described herein. Although shown and described as being separate systems for purposes of illustration, the computer system 236 and the content server system 218 can be partially and/or fully integrated.

User interface systems 130 may be communicatively coupled to the content distribution system 216 via one or more corresponding access points 258. User interface systems 130 may include a display device configured to display or otherwise present and/or allow access to content 234 to a passenger, for example, via a GUI for generating screens, pages, or webpages. The user interface system 130 includes a hardware interface to connect to an access point 258 that provides a wired and/or a wireless connection for the user interface system 130. One or more user interface systems 130 may comprise a software application that a passenger downloads and installs onto their associated PED to receive, view and/or otherwise access content 234, provide use instructions 254, or receive control signals 256 via an access point 258 or may be preprogrammed into the user interface system 130. The user interface system 130 may be utilized by the passenger to enter or input passenger instructions 254 to interact with content 234 (e.g., cause the user interface system 130 to transmit a digital key (signal associated with digital key) to unlock and/or lock a lock), and control the manner in which the selected content 234 is received and/or presented.

The user interface system 130 can include an input/output system (not shown) for permitting the passenger to communicate with system 210, such as via an exchange of control signals 256 and passenger instructions 254. For example, the input system can permit the passenger to enter one or more passenger instructions 254 for controlling the operation of system 210. Illustrative passenger instructions 254 can include instructions for initiating communication with the content server system 218 to perform one or more functions described herein, such as accessing and/or using the selected content 234.

If a fee is required for accessing the content 234 (e.g., a fee for accessing a digital key), establishing bidirectional communication connectivity, or for any other reason, payment information likewise can be entered via the input/output system. Access to functions of the content server system 218 may require authentication via user credentials (e.g., passwords, biometrics, usernames, etc.) provided via an input device of the user interface system 130. The input/output system can be provided in any conventional manner and typically includes a touch screen, microphone (e.g., voice input commands), camera (e.g., gesture and/or facial recognition) one or more switches (or pushbuttons), such as a keyboard or a keypad, and/or a pointing device, such as a mouse, trackball, or stylus.

The vehicle 200 includes a plurality of enclosures 280 and 290, each associated with a lock system 282, 292, respectively. The lock system may be physically coupled or otherwise configured to lock the enclosure (e.g., so as to control access to the enclosure). Each lock system may be associated with a corresponding key, which is stored in server system 218, remote content source 220, and/or user interface system 130. A user may access the key via user interface system 130 (e.g., obtain the digital key on the user interface system, gain access to the digital key embedded in an application of the user interface system upon authentication), and communicate with lock system 282 or 292 to unlock enclosure 280 or 290. For example, a user may make a purchase and/or send selection information such as user identification information associated with an enclosure 280 or 290 to server system 218. Server system may identify a digital key associated with the enclosure 280 or 290 based on the selection information obtained, and transmit the digital key to user interface system such that the user interface system can communicate with lock system 282 or 292 using the digital key. Additionally or alternatively, server system may identify the digital key based on the selection information obtained, and allow a user to access the digital key (e.g., a key embedded in an application of user interface system 130) such that the user interface system can communicate with lock system 282 or 292 using the digital key.

Upon receiving a digital key based on a purchase or other input, the user may communicate/transmit the key or signal associated with the key (e.g., 281, 291) via short range wireless communications protocol to a lock system (e.g., 282, 292) associated with the digital key. Lock system 282 includes an electronic lock that controls access to first enclosure 280. Lock system 292 includes an electronic lock that controls access to second enclosure 290. Enclosures can comprise a space of any shape and size to be locked and unlocked by a locking system. Exemplary enclosures include, among other things, crew rest areas, duty free product carts or enclosures, galley carts, lounges, storage areas (e.g., for secure storage of valuable personal items such as instruments, jewelry, documents), lavatories, workout areas, sleeping rooms, massage lounge, salon lounge, nursing lounges, and flight deck doors. The transmission of digital key 234 can be automatic when the user interface system having the digital key is placed within a preset distance (e.g., within 4 cm) of the lock system or component thereof. Additionally or alternatively, a user input or action (e.g., entering a password, a gesture, biometric information) may cause the digital key to be transmitted (communicated) to the lock system or component thereof.

FIG. 2B is a schematic block diagram illustrating an example content distribution system in accordance with the present disclosure. FIG. 2B illustrates content distribution system 216 for the system 210. The content distribution system 216 couples and supports communication between the information system controller 219, and the plurality of user interface systems 130. Thus, in various embodiments, the content distribution system 216 may provide for an internal network system of vehicle 200.

The content distribution system 216, for example, can be provided as a conventional wired and/or wireless communication network, including a telephone network, a local area network (LAN), a wide area network (WAN), a campus area network (CAN), personal area network (PAN) and/or a wireless local area network (WLAN) of any kind. Exemplary wireless local area networks include wireless fidelity (Wi-Fi) networks in accordance with Institute of Electrical and Electronics Engineers (IEEE) Standard 522.11 and/or wireless metropolitan-area networks (MANs), which also are known as WiMax Wireless Broadband, in accordance with IEEE Standard 522.16. Preferably being configured to support high data transfer rates, the content distribution system 216 may comprise a high-speed Ethernet network, such as any type of Fast Ethernet (such as 100 Base-X and/or 100 Base-T) communication network and/or Gigabit (such as 1000 Base-X and/or 1000 Base-T) Ethernet communication network, with a typical data transfer rate of at least approximately one hundred megabits per second (100 Mbps) or any other transfer rate. To achieve high data transfer rates in a wireless communications environment, free-space optics (or laser) technology, millimeter wave (or microwave) technology, and/or Ultra-Wideband (UWB) technology can be utilized to support communications among the various system resources, as desired.

As illustrated in FIG. 2B, the content distribution system 216 can be provided as a plurality of area distribution boxes (ADBs) 260, a plurality of floor disconnect boxes (FDBs) 262, and a plurality of seat electronics boxes (SEBs) (and/or video seat electronics boxes (VSEBs) and/or premium seat electronics boxes (PSEBs)) 264 being configured to communicate in real time via a plurality of wired and/or wireless communication connections 266. The content distribution system 216 likewise can include a switching system 268 for providing an interface between the content distribution system 216 and the information system controller 219. The switching system 268 can comprise a conventional switching system, such as an Ethernet switching system, and is configured to couple the information system controller 219 with the area distribution boxes 260. Each of the area distribution boxes 260 is coupled with, and communicates with, the switching system 268. In addition, the content distribution system 216 includes one or more wireless access points (WAPs) (258A to 258N) connected in communication with the switch system 268 for wireless distribution of content to user interface systems 130, such as for example, PEDs.

Each of the area distribution boxes 260, in turn, may be coupled to, and communicate with, at least one floor disconnect box 262. Although the area distribution boxes 260 and the associated floor disconnect boxes 262 can be coupled in any conventional configuration, for example, the associated floor disconnect boxes 262 are disposed in a star network topology about a central area distribution box 260 as illustrated in FIG. 2B. Each floor disconnect box 262 is coupled with, and services, a plurality of daisy-chains of seat electronics boxes 264. The seat electronics boxes 264, in turn, are configured to communicate with the user interface systems 130. Each seat electronics box 264 can support one or more of the user interface systems 130.

The switching systems 268, the area distribution boxes 260, the floor disconnect boxes 262, the seat electronics boxes (and/or video seat electronics boxes (VSEBs) and/or premium seat electronics boxes (PSEBs)) 264, the antenna system 228, the transceiver system 230, the content source 212, the information system controller 219, and other system resources of the system 210 are provided as line replaceable units (LRUs). The use of LRUs may facilitate maintenance of the system 210 because a defective LRU can simply be removed from the system 210 and replaced with a new (or different) LRU. The defective LRU thereafter can be repaired for subsequent installation. Advantageously, the use of LRUs can promote flexibility in configuring the content distribution system 216 by permitting ready modification of the number, arrangement, and/or configuration of the system resources of the content distribution system 216. The content distribution system 216 likewise can be readily upgraded by replacing any obsolete LRUs with new LRUs.

The content distribution system 216 can include at least one FDB internal port bypass connection 270 and/or at least one SEB loopback connection 272. Each FDB internal port bypass connection 270 is a communication connection 266 that permits floor disconnect boxes 262 associated with different area distribution boxes 260 to directly communicate. Each SEB loopback connection 272 is a communication connection 266 that directly couples the last seat electronics box 264 in each daisy-chain of seat electronics boxes 264 for a selected floor disconnect box 262 as shown in FIG. 2B. Each SEB loopback connection 272 therefore forms a loopback path among the daisy-chained seat electronics boxes 264 coupled with the relevant floor disconnect box 262.

The various aspects of the present disclosure may be implemented without using FDB 262. When FDB 262 is not used, ADB 260 communicates directly with SEB 264 and/or information system controller 219 may communicate directly with SEB 264 or the seats. The various aspects of the present disclosure are not limited to any specific network configuration.

Figure 3:
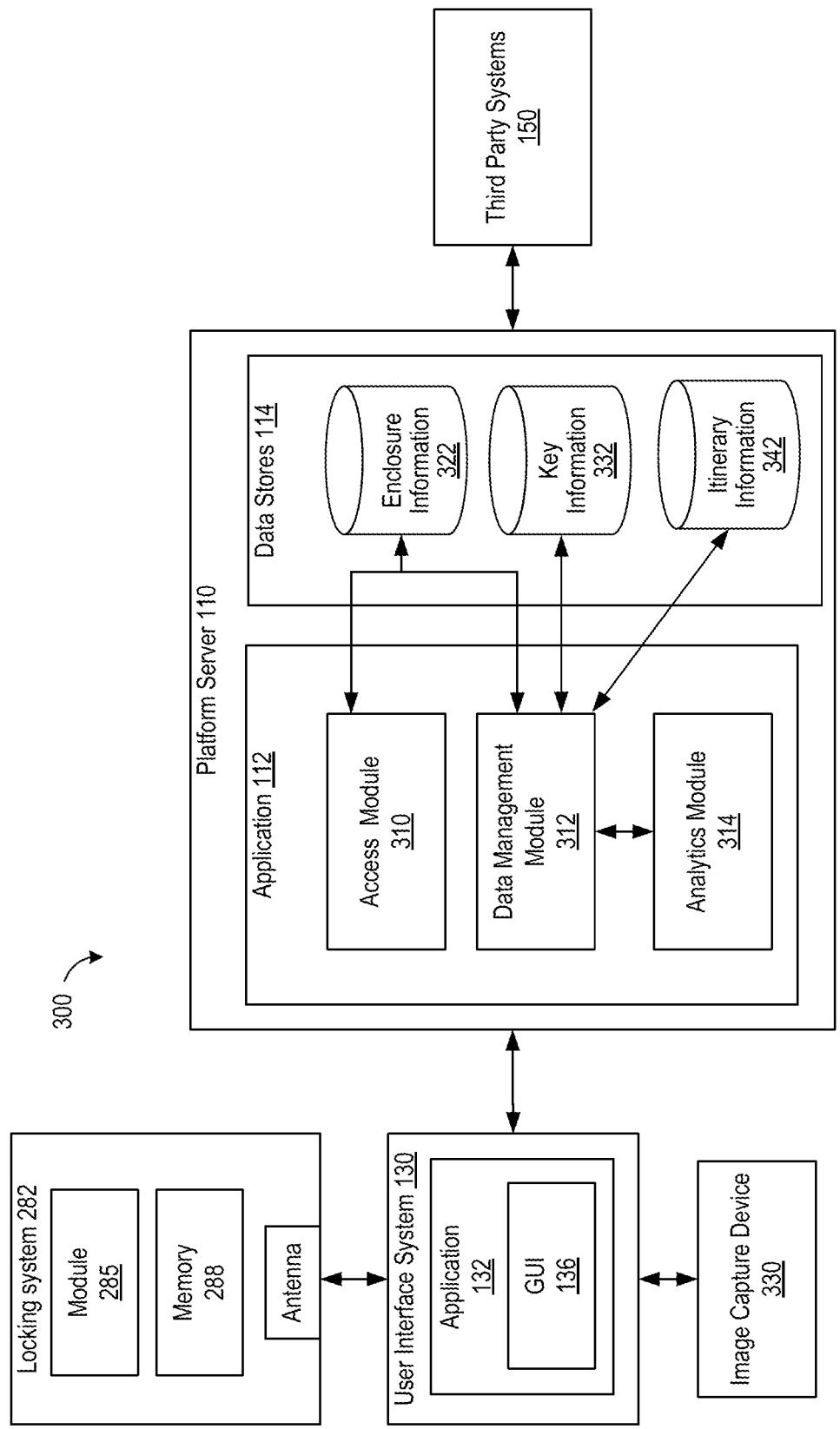
FIG. 3 schematically illustrates an example platform environment in accordance with the present disclosure.

FIG. 3 schematically illustrates an example platform environment in accordance with the present disclosure. FIG. 3 illustrates a computing environment 300 including the user interface system 130 and a platform server 110 as described above in connection with FIG. 1. In accordance with various embodiments herein, the user interface system 130 may communicate with platform server 110 to obtain access to a digital key that allows a user to access one or more enclosed spaces within the vehicle, as well as other content. User interface system 130 may also communicate with locking system 282 having lock/unlock module 285 and memory 288 to cause a lock of the locking system to lock and/or unlock based on, for example, signals associated with digital keys and received from user interface system 130.

The application 112 presents enclosures (e.g., enclosure 280 of FIG. 2A), receives inputs from the user interface system 130 that are associated with an enclosure (e.g., selection information), and requests/obtains access to one or more digital keys associated with the enclosure and/or its locking system. The digital keys may be transmitted to the user interface system 130 and presented by the application 132, may be stored in a data store and made accessible, and/or may already be embedded in a software application of user interface system 130. The user may receive a notification that access to the digital key is available. The passenger may utilize the application 132 of the user interface system 130 to browse enclosures available for access for products, services and/or storage and make one or more selections and/or purchases, which causes the application 132 to generate command instructions including the selection of an enclosure to the platform server 110. The application 112 may receive the instructions, retrieve a key associated with the selected enclosure, and package the key (and/or control instructions to unlock a key) into a signal communicated to the user interface system 130, which can then store the key. In various embodiments, the user interface system 130 is able to communicate inputs and receive information from the application 112 over the wireless connection provided by the system 210, which provides the environment 300 the capability to process user inputs and/or transactions and issue digitals keys based on such inputs and/or transactions.

The platform environment 300 may be a computing environment hosted by, for example, platform server 110 of FIG. 1, and may be executed thinly or thickly by application 112 and/or application 132. The application 132 can include instructions that, when executed by a processor, displays GUI 136. The passenger, crewmember and/or other user may interact with GUI 136 via an input device coupled to the user interface system 130 to generate screens, webpages, and other interfaces for receiving inputs. The application 132 may then transmit the inputs to the platform server 110 for performing the various functions described herein. For example, the user interface system 130 may generate GUI 136, by application 132 functioning as a thin or thick client. In one embodiment, the user interface system 130 includes application 132 installed on the user interface system 130 (e.g., a PED and/or in-seat device) as a software application defined by instructions stored in the local data store 134. In this embodiment, the user interface system 130 locally executes the instructions to generate GUI 136, through which a user may interact with screens displayed by the GUI to obtain or access a trusted key that is associated with an enclosed space (e.g., such as enclosures 280 of FIG. 2A). Alternatively, in some embodiments, the application 132 may be a web-browser application through which the user interface system 130 may access the application 112 implemented as a browser-based portal application. In this embodiment, the GUI 136 of the client application 132 generates screens displaying webpages hosted by the platform server 110 for interacting with the application 112. User inputs may include any interaction with the application 132, for example, instructions and commands as described above in connection to FIG. 1 and selection information input in response to prompts from the application 112 or otherwise. Selection information may include, but is not limited to, passenger or crew member credentials usable for authenticating access to the application 132 and/or application 112, itinerary identifying information, purchase identifying information and/or enclosure identifying information. The selection information could be associated with accessibility of one or more enclosed spaces and/or digital keys. Screens generated by the GUI 136 may include textboxes, text areas, drop-down menus, check boxes, sliders, etc. where passenger input data may be provided.

Itinerary identifying information may include, for example but not limited to, boarding pass information (e.g., record locator or reservation code, ticket number, etc.), flight information (e.g., flight times, departing destination, arriving destination, flight numbers, operating airline identifiers), and/or seat location information. This information could be used to determine what enclosures are available and/or restrictions associated with enclosures (e.g., access times). This information could also include information relating to a selection made pre-flight, which is associated with digital key(s) associated with one or more enclosures within the vehicle. In some embodiments, the user interface system 130 may include or be communicatively coupled to an image capture device 330, such as a camera, that can be utilized to capture an image of a boarding pass and extract the necessary information therefrom. Additionally or alternatively, the image capture device 330 can be used to scan a barcode (e.g., a QR code) within the vehicle that is associated with the enclosure, and to present purchase options associated with the enclosure to the user via a user interface system 130. For example, a user may walk up to an enclosure, scan a QR code positioned near the enclosure, and receive selections available associated with the enclosure (e.g., availability, price, services offered). Application 132 may comprise computer readable instructions that scans the image and extracts itinerary information displayed on the boarding pass, and/or enclosure and/or digital key identifying information associated. The extracted information can be used to identify and/or retrieve content to present to the user (e.g., digital keys associated with itinerary information (e.g., passenger information), purchase or selection options) via platform 110. In some embodiments, the boarding pass itself may also include a bar code that the application 132 may scan to extract itinerary or purchase identifying information. In some embodiments, a passenger may have an electronic boarding pass that may be stored in a local data store 134 of the user interface system 130. The electronic boarding pass may be loaded to or otherwise accessed by the application 132 and used to obtain itinerary identifying information therefrom.

As illustrated in FIG. 3, application 112 may include a plurality of software modules, each comprising computer-readable instructions for executing functions associated therewith. For example, the application 112 may comprise an access module 310, a data management module 312, and an analytics module 314. As illustrated, the platform environment 300 may include the application 112 coupled to one or more data stores 114. In the illustrative example, the data store(s) 114 may include, at least, a data store 332 configured to store digital key information and a data store 322 configured to store enclosure information. Data stores can also store information such as timing information, user identification information, and/or purchase information. The data stores 322 and 332 (and any other data stores) may be included in a single data storage device, separate data storage devices, or distributed in a plurality of data storage devices.

The access module 310 may include instructions for providing user access to the platform server 110. The access module 310 may include instructions for providing passenger access to the platform server 110, based on credentials and/or identifying information received from the user interface system 130. In some embodiments, a crew member or passenger may enter passenger credentials, such as username, passwords, biometrics, etc. for authenticating access to the application 132, which are validated against credentials stored in one of the data stores 114. In other embodiments, access to the platform server 110 and the functions performed therein may be granted based on itinerary information (e.g., seat and flight information) and such itinerary information could include information associated with a purchase. For example, a first screen generated by the GUI 136 may prompt the passenger to provide one or more pieces of itinerary identifying information (e.g., a record locator or reservation code, ticket number, flight number, departure city, etc.) before permitting further access to the functions executed by the platform server 110. The provided itinerary information may be validated against information stored in an itinerary information data store and/or verified against information accessed through an airline operator system (e.g., one of the third party systems 150). In some embodiments, access may be granted based on only itinerary information, only crew member credentials, only passenger credentials, or a combination thereof (e.g., one entered prior to the other).

The data management module 312 may include instructions for receiving data inputs from a user interface system 130, storing data in data store(s) 114, obtaining data from data store(s) 114, and obtaining third party information from external (e.g., third party) systems 150. The data management module 312 may include one or more importer modules as described above configured to retrieve data from third party systems, some or all of which may be used as enclosure restrictions. The data management module 312 may also receive passenger inputs comprising selection/key request parameters relating to one or more enclosures. The data management module 312 may also obtain data from a database of vehicle 200, for example, flight data where the vehicle 200 is an aircraft.

One or more data stores (e.g., 342) may store itinerary information in association with itinerary identifying information. For example, a data store may be configured to store itinerary information representative of travel arrangements for a plurality of passengers. The itinerary information may be stored in association with a record identifier usable to retrieve itinerary information for a given itinerary. The record identifier may be a unique itinerary code, such as a reservation number, issued to passenger upon booking a flight(s). The itinerary information may identify passenger(s) involved, departure airport(s), departure time(s), flight information for each leg, connecting information, arrival airport(s), arrival time(s), delays affecting times, reroutes affecting locations, etc.

In some embodiments, itinerary information and the itinerary identifying information associated therewith may be received from the user interface system 130 based on passenger inputs and stored in the itinerary information data store(s). In some embodiments, itinerary information may also be generated by a third party system 150, for example, an airline operator system. For example, a passenger may select travel arrangements from a webpage hosted by the airline operator system and the airline operator system may generate itinerary information including the selected arrangements and purchases relating to one or more enclosure(s), associate the information with a record locator, and store the information in association with the code in a database of the airline operator system. The record locator may be provided to the passenger with a confirmation of the booking. The itinerary information, associated pre-purchase information, and/or any other information associated with pre-purchased keys/enclosures may be uploaded to one or more data stores prior to take off and during travel. When the user is onboard the vehicle, the pre-purchase information included in or associated with the itinerary information may be used to obtain access to the key. The access module 310 may also be utilized to retrieve the itinerary information to validate the information received from user interface system 130.

The data store 332 may store digital key information, and may store such information in association with itinerary identifying information, enclosure information, purchase information, passenger identifying information, etc. Data store 322 may store enclosure information such as restrictions (e.g., available times, criteria for purchasing time in an enclosure (e.g., age restrictions)), costs, services offered within an enclosure, products offered within an enclosure, etc.

The data management module 312 may include instructions to forward obtained data to the analytics module 314, which may contain instructions for processing the data and performing various functions of the application 112. The analytics module 314 provides for generating an advertisement for an enclosure, product or service available in-flight based on the information from the data management module 312. The analytics module 314 may evaluate user supplied parameters to determine user preferences and generate advertisements based thereon.

The analytics module 314 may generate advertisements based on evaluating both the user defined parameters (e.g., user information such as connecting flight, information associated with products or services purchased by the user), travel restrictions (e.g., delay), and/or enclosure restrictions (e.g., enclosures with availability at times other than enclosures already purchased by the user).

The analytics module 314 may include instructions for transmitting the advertisements to the data management module 312 on available enclosures and associated restrictions, pricing, and other criteria from the data stores. Data management module 312 may then transmit the advertisements (or other content) to the user interface system 130 for review by a passenger via the GUI 136. If the user makes a selection, the data management module 312 receives the selection information and uses it to retrieve a digital key associated with the selection (or instructions for providing access to the locally stored key) from data stores 114, and sends this to the user application 132.

Figure 4:
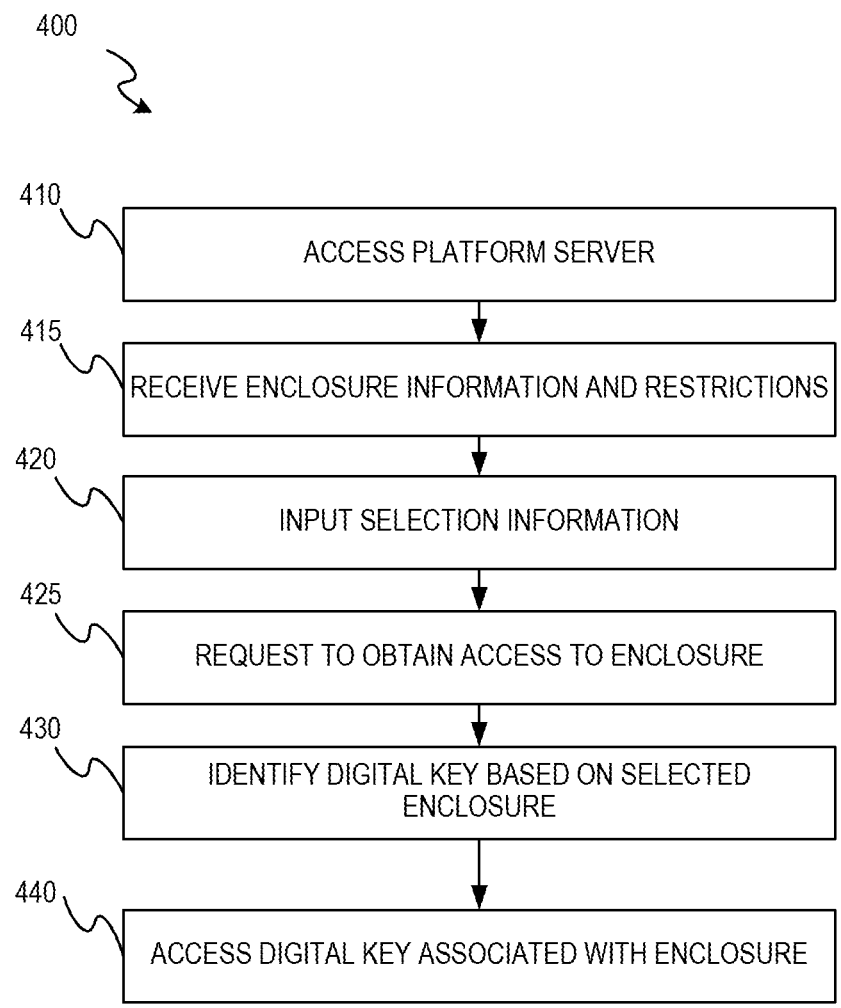
FIG. 4 is an example method flow for making a purchase and wirelessly unlocking a lock system in accordance with the present disclosure.

FIG. 4 is an example method flow for obtaining a digital key associated with a lock system of an enclosure in accordance with the present disclosure. The process 400 may be performed by one or more devices disclosed herein, such as for example, system 100 illustrated in FIG. 1, discussed above. For example, the process 400 may be executed in part or wholly by the platform server 110 executing application 112 and/or the application 132 executed at the user interface system 130. In various embodiments, the process 400 may be performed partially or completely by the plurality of software modules described in connection to FIG. 3.

When a selection is made relating to an enclosure (e.g., a purchase), selection information may be recorded and stored in association with itinerary and/or user identifying information and may be stored in one or more data stores and/or at a third party system. In some embodiments, a user may be provided with access to a digital key associated with the selection, and a message that the digital key is available for access. In some embodiments, a digital key may be accessed by entering user identifying information and/or itinerary information. The following steps of process 400 may be performed using any user interface system 130, for example, a PED and/or an in-seat device integrated into the vehicle 200 and connected to system 210. The user interface system 130 may be connected to the system 210 via a browser-based portal application or a preinstalled software application while aboard vehicle 200 and connected to on-board communication network or may be coupled to the platform server via any network connection as described above.

At block 410, a user accesses platform server 110, for example, via user interface system 130. The passenger (or other user) may be required to input credentials into the user interface system 130 to authenticate access via the access module 310. In some embodiments, the platform server 110 may prompt the passenger to enter itinerary identifying information prior to permitting access to the functionality of the application. The access module 310 may receive the itinerary information (or other data) and confirm that the itinerary information (or approval for user access) exists within the data store(s) and/or an airline operator system. In some embodiments, the information may be provided via a passenger input into graphical user interface 136. In some embodiments, the identifying information may be extracted from an image of a boarding pass or a QR code or other barcode associated with an enclosure acquired using an image capture device coupled to the user interface system 130. In some embodiments, the user interface system 130 may transmit the scan to the application 112, which may extract the necessary information therefrom. In yet other embodiments, where an electronic boarding pass is stored on the user interface system or loaded into the application 132, the identifying information may be extracted from the stored data.

At block 415, the user receives enclosure information, including restrictions, pricing information, etc., which can be viewed via screens displayed by the GUI. At block 420, the user inputs selection information associated with an enclosure it wishes to access via user interface system 130, and the selection information to received and analyzed by data management module 312. Data management module 312 may additionally or alternatively obtain selection information from a data store, for example, where a user made a selection previously, and the enclosure information associated with the selection is stored in one or more data stores in further association with user information. The selection information can include, for example, digital key identifying information, identification of an enclosure to be unlocked, information of a time period during which the enclosure may be unlocked, information on multimedia content to be played in the enclosure during a time period, information on an auto door-open time (e.g., at the end of the time period during which a user has access to an enclosure), information on a product or service to be obtained by the user via an enclosure, and so forth. In some embodiments, the selection information input or otherwise obtained at 420 may be a first instance of requesting a selection (e.g., a purchase) requiring access to an enclosure. Alternatively, block 420 may include a request to modify an existing purchase, for example, by changing an access time, multimedia content to be played within the enclosure, a service provided within the enclosure, etc.

At block 425 (which can be part of the same operation, a previous operation, or a subsequent operation or block 420), a request to obtain access to the enclosure associated with the selection is obtained by the application 112.

At block 430, platform server 110 identifies a digital key based on the selected enclosure (e.g., the enclosure associated with the selection, the enclosure for which a request to obtain access was made). User interface system 130 then packages the digital key, including restrictions, for transmission to the user. The digital key may be transmitted to user interface system 130 after a selection is made, or the digital key may have already been embedded in an application of user interface system 130. Where the digital key has already been embedded in the application of user interface system 130, authentication of the user and/or may be required before the user may access the digital key.

At block 440, a user is able to access the packaged digital key transmitted by platform server 110. If the digital key is available for use (e.g., if within the time period for which the digital key is configured to be used), the user may initiate a key exchange between user interface system 130 and a locking system of the enclosure to unlock the locking system. The digital key may be sent to the associated lock system, and the lock of the lock system can be unlocked allowing the user to enter the enclosure. For example, when the user approaches the lock system with user interface system 130 and is within range of locking system for short range wireless communication, the digital key may automatically be sent.

FIG. 5 is an example method flow for providing a digital key to a user interface system in accordance with the present disclosure. The process 500 may be performed by one or more devices disclosed herein, such as for example, system 100 illustrated in FIG. 1, discussed above. For example, the process 500 may be executed in part by application 132 of user interface system 130 hosted by the platform server 110 executing application 112. In various embodiments, the process 500 may be performed partially or completely by the plurality of software modules described herein.

At block 510, platform server 110 connects to user interface system 130, for example based on a user authentication input via user interface system 130, and instructions from access module 310. At block 520, upon selection of an enclosure by a user, platform server 110 receives selection information from data stores 322, 332, 342, and/or from user inputs to the user interface system 130. At block 530, platform server 110 associates the selection information received at block 520 with an enclosure, associates the enclosure with a lock system, and associates the lock system with a digital key. At block 540, platform server 110 provides access to the digital key to a user via user interface system 130. For example, the platform server 110 may allow a digital key embedded into a software application of the user interface system 130 to be accessed, and/or transmit the digital key to the user interface system 130. With the digital key, the platform server 110 may also communicate access information to user interface system 130, which can be based on the restrictions that apply to the digital key. The user may then cause the user interface system 130 to communicate the digital key to an associated lock system to lock or unlock an enclosed space.

FIG. 6 illustrates a block diagram of a computing system, in accordance with various aspects of the present disclosure. FIG. 6 is a high-level block diagram showing an example of the architecture of a processing system 600 (also referred to herein as a computing device) that may be implemented as any one or more of the components of the embodiments described herein. The processing system 600 can represent platform server 110, a user interface system 130, a third party system 150, content server system 218, computer system 236, or other systems and components as described herein. Note that certain standard and well-known components which are not germane to the present aspects are not shown in FIG. 6.

The processing system 600 includes one or more processor(s) 602 and memory 604, coupled to a bus system 605. The bus system 605 shown in FIG. 6 may be an abstraction that represents any one or more separate physical buses and/or point-to-point connections, connected by appropriate bridges, adapters and/or controllers. The bus system 605, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1366 bus (sometimes referred to as "Firewire") or any other interconnect type.

The processor(s) 602 are the central processing units (CPUs) of the processing system 600 and, thus, control its overall operation. In certain aspects, the processors 602 accomplish this by executing software stored in memory 604. A processor 602 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 604 represents any form of random access memory (RAM), read-only memory (ROM), flash memory, or the like, or a combination of such devices. Memory 604 includes the main memory of the processing system 600. Instructions 606 may be used to implement the functions and processes described above, for example, in FIGS. 1-5. For example, the software stored in memory 604 may be software architecture or software modules described in FIG. 3 for providing digital keys to user interface devices. The memory 604 may be coupled to the processor 602, and the processor 602 may be configured to execute instructions (e.g., software) stored in the memory 604 to carry out the various aspects of the wireless unlocking system 100 described herein.

Also connected to the processors 602 through the bus system 605 are one or more internal mass storage devices 610, and a network adapter 612. Internal mass storage devices 610 may be, or may include, any conventional medium for storing large volumes of data in a non-volatile manner, such as one or more magnetic or optical based disks, flash memory, or solid-state drive.

The network adapter 612 provides the processing system 600 with the ability to communicate with remote devices (e.g., over a network and may be, for example, an Ethernet adapter or the like).

The processing system 600 also may include one or more input/output (I/O) devices 608 coupled to the bus system 605. The I/O devices 608 may include, for example, a display device, a touch screen device, a microphone for voice commands, a camera for detecting gestures and other non-tactile inputs, a keyboard, a mouse, etc. The I/O device may be in the form of a handset having one or more of the foregoing components, such as a display with a real or virtual keyboard, buttons, and/or other touch-sensitive surfaces.

The processing system 600 also may include or otherwise be communicatively coupled to a display 614 (e.g., a display monitor or screen) coupled to bus system 605 by a display adaptor 616. The display adaptor 616 may include a graphics adapter to improve the performance of graphics intensive applications and a video controller. The processor 602 may execute instructions in memory 604 to generate a graphical user interface, such as GUI 136, for presenting one or more screens, for example, webpages or other visually presented information. The processing system 600 may also include a graphics-processing unit 618. Graphics-processing unit 618 may be a specialized electronic circuit designed to manipulate and alter memory to accelerate the creation of images in a frame buffer intended for output to a display, for example, outputting images via GUI 136. In general, graphics-processing unit 618 is efficient at manipulating computer graphics and image processing, and has a highly parallel structure that makes it more effective than general-purpose CPUs for algorithms where processing of large blocks of data is done in parallel.

Although particular embodiments have been shown and described, it is to be understood that the above description is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims. For example, not all of the components described in the embodiments are necessary, and the invention may include any suitable combinations of the described components, and the general shapes and relative sizes of the components of the invention may be modified. Accordingly, embodiments are intended to exemplify alternatives, modifications, and equivalents that may fall within the scope of the claims. The invention, therefore, should not be limited, except to the following claims, and their equivalents.

Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more.

The various illustrative logical or functional blocks and algorithm operations described in connection with the embodiments disclosed herein may be implemented as electronic hardware, computer software, or combinations of both. To clearly illustrate this interchangeability of hardware and software, various illustrative components, blocks, modules, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present inventive concept.

The hardware used to implement the various illustrative blocks and modules described in connection with the various embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

What is claimed is:

1. A system for providing access to an enclosed space within a vehicle, the system comprising:
    a content distribution system configured to provide a vehicle communication network for the vehicle;
    at least one data store coupled to the vehicle communication network, the at least one data store configured to store a set of digital keys associated with a set of lock systems within the vehicle; and
    at least one processor coupled to the vehicle communication network and to at least one memory programmed with executable instructions, the at least one processor configured to execute the executable instructions to:
        receive, from a user interface system carried by the vehicle and coupled to the vehicle communication network, a request for an access to a platform system carried by the vehicle and coupled to the vehicle communication network by providing itinerary identifying information associated with a travel of a passenger in the vehicle and used to authenticate the request for the access to the platform system;
        receive, from the user interface system carried by the vehicle and coupled to the vehicle communication network, selection information associated with a first enclosure having a first lock system of the set of lock systems, the selection information including purchase identifying information to identify a product that is available in the vehicle and purchased by the passenger;
        associate a first digital key with the received selection information; and
        enable the first digital key to be accessed via the user interface system, wherein the digital key allows (1) the product to be delivered to the passenger and (2) the passenger to wirelessly unlock a first door of the first enclosure having the first lock system by sending the first digital key to the first lock system via short range wireless communication.

2. The system of claim 1, wherein the vehicle is an aircraft, and wherein the content distribution system, the at least one data store, the at least one processor, and the at least one memory are within the aircraft.

3. The system of claim 1, wherein the user interface system comprises at least one of a passenger personal electronic device (PED), a crew-member PED, and an in-seat device.

4. The system of claim 1, wherein the first lock system is configured to control access to a first enclosure.

5. The system of claim 4, wherein the first enclosure is a compartment in a galley cart.

6. The system of claim 4, wherein the first enclosure is at least one of a section of a plane, a storage area, a rest area, a lavatory, and a lounge.

7. The system of claim 1, wherein the selection information further comprises at least one of identification information associated with the passenger, payment account information, enclosure identification information, access time information, and rewards program information.

8. The system of claim 1, wherein the at least one processor is configured to execute the executable instructions to enable the first digital key to be accessed via the user interface system by transmitting the first digital key to the user interface system.

9. The system of claim 1, wherein the at least one processor is configured to execute the executable instructions to authenticate the passenger prior to enabling the first digital key to be accessed via the user interface system.

10. The system of claim 9, wherein the at least one processor is configured to execute the executable instructions to authenticate the passenger by receiving and analyzing a password.

11. The system of claim 9, wherein the at least one processor is configured to execute the executable instructions to authenticate the passenger by receiving and analyzing biometric information.

12. A method for wirelessly unlocking a lock within a vehicle, comprising:
    making, via a user interface system carried by the vehicle and coupled to a vehicle communication network, a request for an access to a platform system carried by the vehicle and coupled to the vehicle communication network by providing itinerary identifying information that is read from a boarding pass of a passenger in the vehicle and used to authenticate the request for the access to the platform system;
    inputting, via the user interface system carried by the vehicle and coupled to the vehicle communication network, selection information associated with a first enclosure having a first lock system including the lock, the selection information including purchase identifying information to identify a product that is available in the vehicle and purchased by the passenger;

accessing, via the platform system carried by the vehicle and coupled to the vehicle communication network, a digital key associated with the selection information and the first lock system; and sending the digital key to the first lock system to cause the product to be delivered to the passenger and wirelessly unlock the lock based on a position of the user interface system relative to the first lock system or based on an input from a passenger in the vehicle into the user interface system.

13. The method of claim 12, wherein the first lock system is configured to control access to a first enclosure.

14. The method of claim 13, wherein the first enclosure is a compartment in a galley cart.

15. The method of claim 13, wherein the first enclosure is at least one of a section of a plane, a storage area, a rest area, a lavatory, and a lounge.

16. The method of claim 12, wherein the selection information comprises at least one of identification information associated with the passenger, payment account information, enclosure identification information, access time information, and rewards program information.

17. The method of claim 12, wherein the digital key is further associated with a time.

18. The method of claim 12, further comprising receiving the digital key from the platform system.

19. The method of claim 12, further comprising receiving instructions to send the digital key to the first lock system.

20. The method of claim 12, further comprising receiving information associated with a set of enclosures including the first enclosure, wherein the information comprises at least one of a price and a time.

* * * * *